United States Patent
Ferré i Tomàs

(10) Patent No.: US 11,808,989 B2
(45) Date of Patent: Nov. 7, 2023

(54) METHOD FOR PRODUCING A MICROOPTOELECTROMECHANICAL COMPONENT, AND CORRESPONDING MICROOPTOELECTROMECHANICAL COMPONENT

(71) Applicant: Robert Bosch GmbH, Stuttgart (DE)

(72) Inventor: Rafel Ferré i Tomàs, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/911,463

(22) PCT Filed: Jun. 17, 2021

(86) PCT No.: PCT/EP2021/066402
§ 371 (c)(1),
(2) Date: Sep. 14, 2022

(87) PCT Pub. No.: WO2022/017694
PCT Pub. Date: Jan. 27, 2022

(65) Prior Publication Data
US 2023/0041107 A1    Feb. 9, 2023

(30) Foreign Application Priority Data

Jul. 21, 2020  (DE) .................... 10 2020 209 122.6

(51) Int. Cl.
*G02B 6/35* (2006.01)
*G02F 1/295* (2006.01)

(52) U.S. Cl.
CPC ............ *G02B 6/3502* (2013.01); *G02F 1/295* (2013.01)

(58) Field of Classification Search
CPC .. G02B 6/3502; G02B 6/3504; G02B 6/3506; G02B 6/3508
See application file for complete search history.

(56) References Cited

U.S. PATENT DOCUMENTS

| 5,078,514 A | 1/1992 | Valette et al. |
| 6,993,215 B2 * | 1/2006 | Bruel .................. G02B 6/3566 438/31 |

(Continued)

FOREIGN PATENT DOCUMENTS

| FR | 2865548 A1 | 7/2005 |
| WO | 2010082524 A1 | 7/2010 |

OTHER PUBLICATIONS

English translation of written opinion for PCT/EP2021/066402, dated Oct. 14, 2021. (Year: 2021).*

(Continued)

*Primary Examiner* — Michael Stahl
(74) *Attorney, Agent, or Firm* — NORTON ROSE FULBRIGHT US LLP; Gerard Messina

(57) ABSTRACT

A method for producing a microoptoelectromechanical component and a corresponding microoptoelectromechanical component. The microoptoelectromechanical component is equipped with a base substrate comprising a cavity which is formed therein and is closed by a covering substrate, an optical waveguide on the covering substrate above the cavity, which optical waveguide comprises a sheathed waveguide core, an electrical contact element in the region of the surrounding covering substrate, wherein a contact pad formed by an electrically conductive polysilicon layer is arranged underneath the electrical contact element, wherein the optical waveguide and the covering substrate located thereunder are divided into a stationary portion and a deflectable portion, which can be docked to the stationary portion by electrically deflecting the corresponding portion of the covering wafer.

15 Claims, 4 Drawing Sheets

(56) References Cited

U.S. PATENT DOCUMENTS

2002/0146195 A1 10/2002 Hsu et al.
2004/0264847 A1 12/2004 Koh et al.

OTHER PUBLICATIONS

International Search Report for PCT/EP2021/066402, dated Oct. 14, 2021.

* cited by examiner

METHOD FOR PRODUCING A MICROOPTOELECTROMECHANICAL COMPONENT, AND CORRESPONDING MICROOPTOELECTROMECHANICAL COMPONENT

FIELD

The present invention relates to a method for producing a microoptoelectromechanical component and to a corresponding microoptoelectromechanical component.

BACKGROUND INFORMATION

Photonic devices, which are integrated in microelectromechanical systems (MEMS), are part of the next generation of communication and sensor systems. Owing to the MEMS processes and the silicon-on-insulator (SOI) technique, many elements such as lenses, mirrors, beam splitters, gratings, filters, low-loss waveguides, multiplexers, and light switches can be miniaturized, for example. These elements fall into the category of microoptoelectromechanical systems (MOEMS) and reconfigurable optical add/drop multiplexers (ROADMs).

Optical light switches produced using MEMS technology so as to be compatible with semiconductor processes, e.g., as optical transceivers for the 5G network, are currently being developed.

Three relevant components are required for these optical light switches:

Optical waveguides, which are typically produced from three deposited layers. An upper and a lower layer, also called a bottom clad and a top clad, consist of silicon oxide having a refractive index of around 1.45. A middle layer, called the core, consists of a material, typically silicon nitride, having a greater refractive index than the bottom clad and top clad.

The layers are structured by photolithography, meaning that the core is completely encased by the two clads. The optical waveguide is divided into a stationary portion and a deflectable portion, and the deflectable portion can be docked to the stationary portion for switching by applying an electrical voltage.

Cavity SOI device wafers, on which the optical waveguides are arranged. A substrate wafer, to which the SOI wafer is attached, has a void, i.e., a cavity or a depression. If the region over the cavity is machined using DRIE processes, this region is released and can therefore take on its MEMS function, specifically without the usual vapor etching processes that would otherwise be required without the cavity.

Metal contact pads, which are required for electrically driving the MEMS element and have to have perfect electrical contact between the MEMS substrate.

For light switches, the optical waveguides are arranged on SOI wafers using CMOS processes. In order to release the movable parts of the chip, it is necessary to structure the optical waveguides and the lower SOI region. These two instances of structuring are called "vertical etch" and "DRIE trench."

In order to reduce the optical losses, the movable portion of the waveguide has to dock to the stationary portion very well, which is why the walls of the optical waveguide have to be as perpendicular as possible in this switching region. Since the thickness of the optical waveguide is several micrometers, the use of a soft mask (resist mask) is not sufficient for reproducing the required perpendicular edges.

Since the volume of traffic transmitted by telecommunication networks has increased rapidly owing to high-bandwidth applications such as internet access, multimedia applications for e-commerce, and distributed computing, it is vital to use optical networks for backbone networks, metropolitan networks, and local networks. Optical networks, which use optical fibers as the transmission medium, have exhibited a superior performance/cost ratio over both short and long distances, and the emerging dense wavelength division multiplexing (DWDM)/all-optical networks have exhibited encouraging potential for improvement in terms of speed, capacity, and connectivity of optical telecommunication networks.

U.S. Patent Application Publication No. US 2004/0264847 A1 describes a microoptoelectromechanical waveguide switch (MOEM-WS), constructed by integrating MEMS actuators and micro SPSs on the same substrate. The MOEM-WS is an integrated hybrid microsystem: the microoptoelectromechanical system (MOEMS) is particularly suitable for optical cross-connect switches (OXC) and optical add/drop multiplexers (OADMs). The MOEM-WS provides essential fiber switching capability for purely optical networks, providing numerous associated advantages, such as low costs, low crosstalk, reliability, compactness, high speeds, reconfigurability, modularity, scalability, and insensitivity to signal wavelength and polarization.

SUMMARY

The present invention provides a method for producing a microoptoelectromechanical component and a corresponding microoptoelectromechanical component.

The present invention uses a multilayered hard mask for the "vertical etch."

Preferred developments of the present invention are disclosed herein.

Advantages of the Invention

The production method according to the present invention makes it possible to form highly perpendicular lateral walls of the trench that separates the stationary portion from the deflectable portion. At the same time, the electrically conductive first hard mask layer allows for a good electrical connection between the electrical contact element and the covering substrate via the contact pad remaining thereon.

According to a preferred specific example embodiment of the present invention, an insulation layer, which extends into the cavity, is applied to the base substrate. This allows the covering substrate to be directly bonded to the base substrate.

According to a further preferred specific example embodiment of the present invention, the base substrate and the covering substrate are a silicon substrate.

According to a further preferred specific example embodiment of the present invention, the first hard mask layer is a doped polysilicon layer and the second hard mask layer is a silicon oxide layer. Desired etching selectivity toward the optical waveguide can thus be achieved.

According to a further preferred specific example embodiment of the present invention, the etching opening is formed using a resist mask.

According to a further preferred specific example embodiment of the present invention, the optical waveguide core is made of silicon nitride and is sheathed by a lower covering layer and an upper covering layer made of silicon oxide. Good optical waveguide properties can thus be obtained.

According to a further preferred specific example embodiment of the present invention, the trench-etching is carried out in a two-stage etching process in which the optical waveguide is trenched in a first etching step and the covering substrate located thereunder is trenched in a second etching step. The etching process can thus be optimized for the material in question.

According to a further preferred specific example embodiment of the present invention, the second hard mask layer is removed at least in some regions in the first etching step.

According to a further preferred specific example embodiment of the present invention, the electrical contact element is made of aluminum. This allows for low-resistance coupling of the movable MEMS portion.

BRIEF DESCRIPTION OF THE DRAWINGS

The present invention is explained in greater detail in the following with reference to the exemplary embodiments set out in the schematic figures.

DETAILED DESCRIPTION OF EXAMPLE EMBODIMENTS

In the figures, identical reference signs denote identical or functionally identical elements.

FIGS. 1A-1H are schematic cross-sectional views for illustrating a microoptoelectromechanical component and a corresponding production method according to a specific embodiment of the present invention.

Figure 1A:
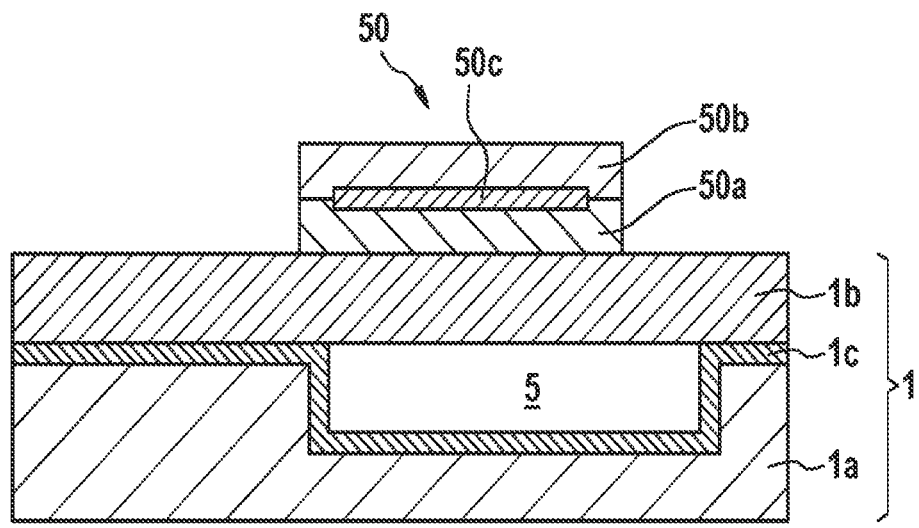
FIGS. 1A-1H are schematic cross-sectional views for illustrating a microoptoelectromechanical component and a corresponding production method according to a specific example embodiment of the present invention.

In FIG. 1A, reference sign 1 denotes an SOI substrate, which comprises a base substrate 1a comprising a cavity 5 which is formed therein and is closed by a covering substrate 1b. By way of, for example, SOI direct bonding, the covering substrate 1b is bonded to an insulation layer 1c made of silicon oxide, which is applied to the base substrate 1a and extends continuously into the cavity 5.

On the covering substrate 1b, an optical waveguide 50 is formed above the cavity 5, which optical waveguide comprises a sheathed waveguide core 50c. The optical waveguide core 50c is made of silicon nitride, for example, and is sheathed by a lower covering layer 50a and an upper covering layer 50b, which are each made of silicon oxide.

Figure 1B:
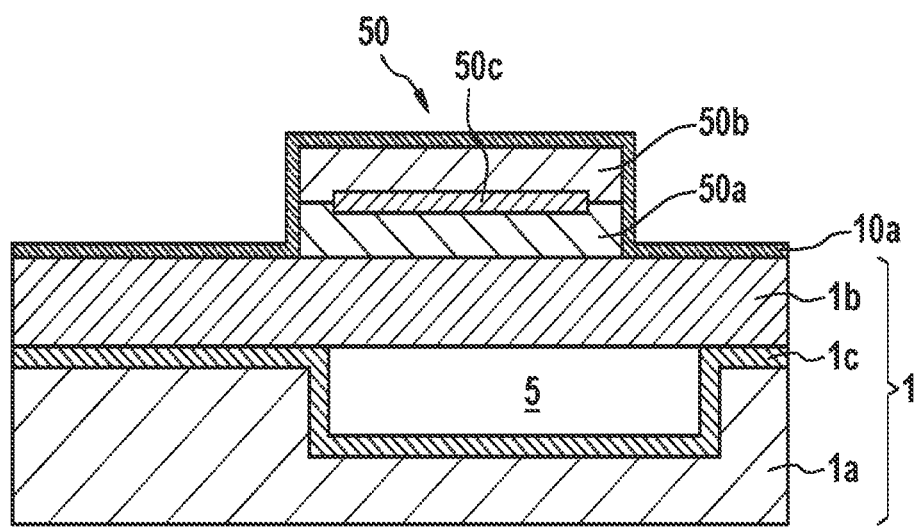

Furthermore, with reference to FIG. 1B, an electrically conductive first hard mask layer 10a is applied over the optical waveguide 50 and the surrounding covering substrate 1b, which consists of a doped polysilicon layer, for example.

Figure 1C:
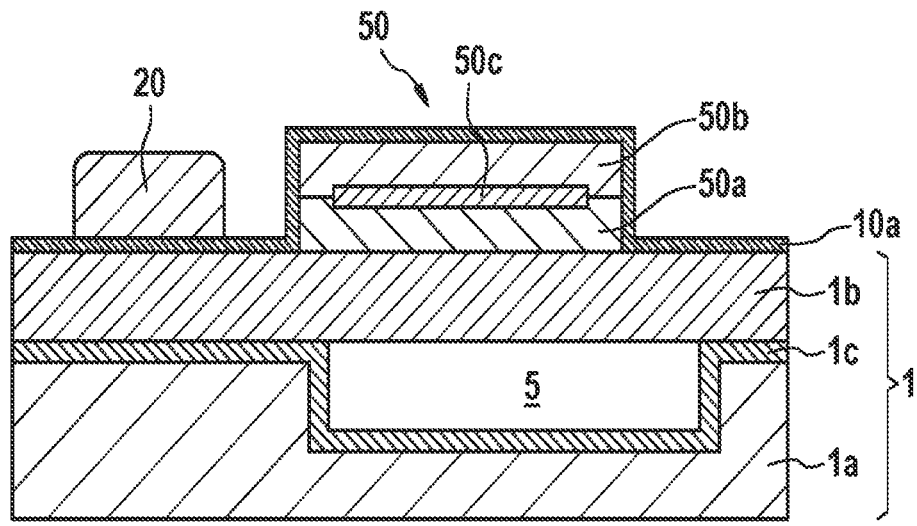

Following this, according to FIG. 1C, a metal coating, e.g., made of aluminum, is deposited over the first hard mask layer 10a and is structured to form an electrical contact element 20 on the first hard mask layer 10a in the region of the surrounding covering substrate 1b.

Figure 1D:
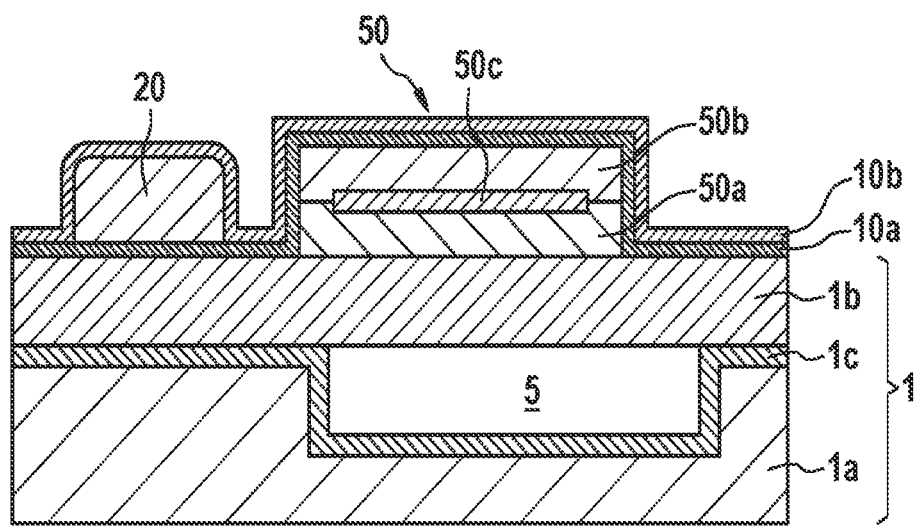

As shown in FIG. 1D, a second hard mask layer 10b, which, for example, consists of silicon oxide, is then applied over the first hard mask layer 10a and the electrical contact element 20.

Figure 1E:
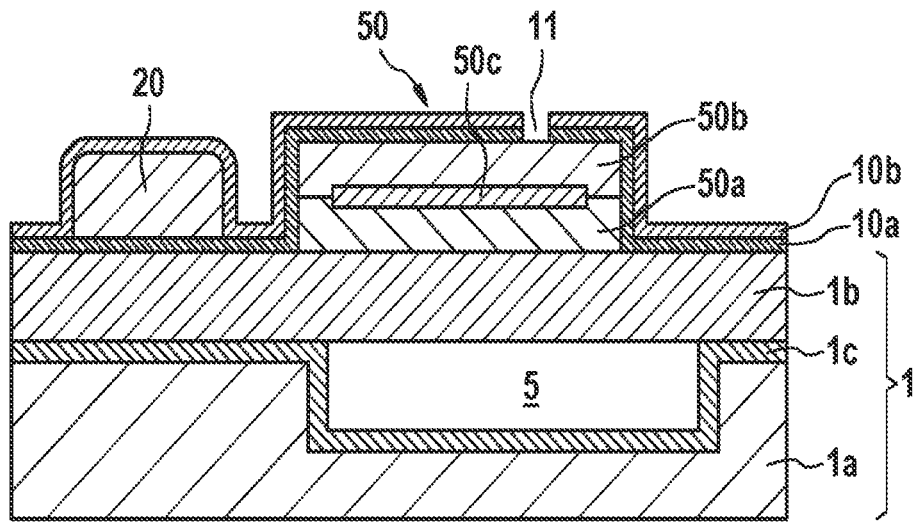

According to FIG. 1E, an etching opening 11 is then formed in the first and the second hard mask layer 10a, 10b for exposing some regions of the upper face of the optical waveguide 50. By way of example, the etching opening 11 may be formed using a resist mask (not shown).

Figure 1F:
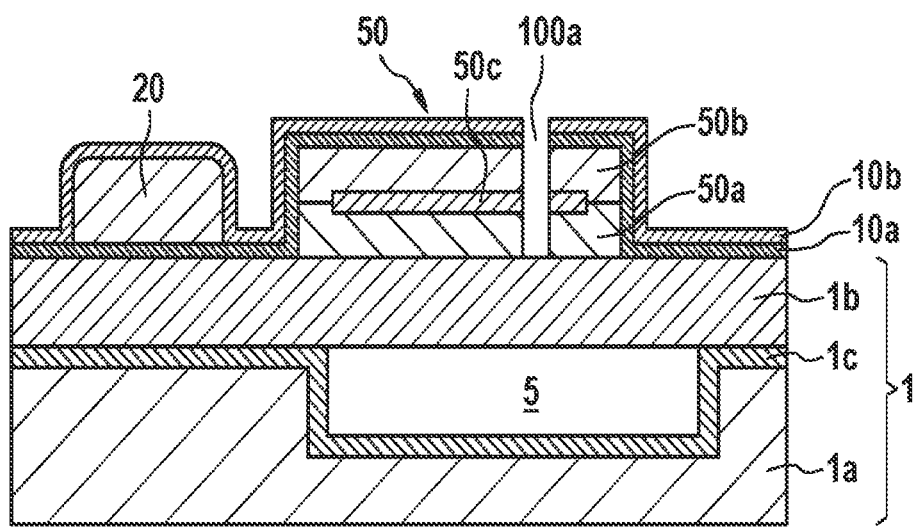

Once the resist mask has been removed, according to FIG. 1F trench-etching of the optical waveguide 50 is carried out in a first etching step. This first etching step stops at the covering substrate 1b located thereunder, for example, and produces a partial trench 100a.

Figure 1G:
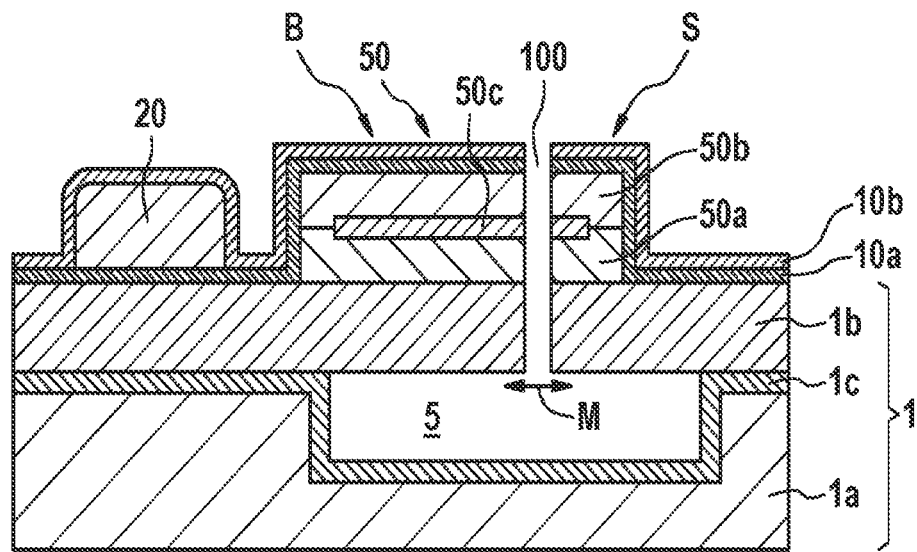

According to FIG. 1G, in a subsequent second etching step, the covering substrate 1b located under the partial trench 100a is trenched as far as the cavity 5 in order to produce a continuous trench 100. This continuous trench 100 divides the optical waveguide 50 and the covering substrate 1b located thereunder into a stationary portion S and a deflectable portion B, as explained in greater detail below.

Figure 1H:
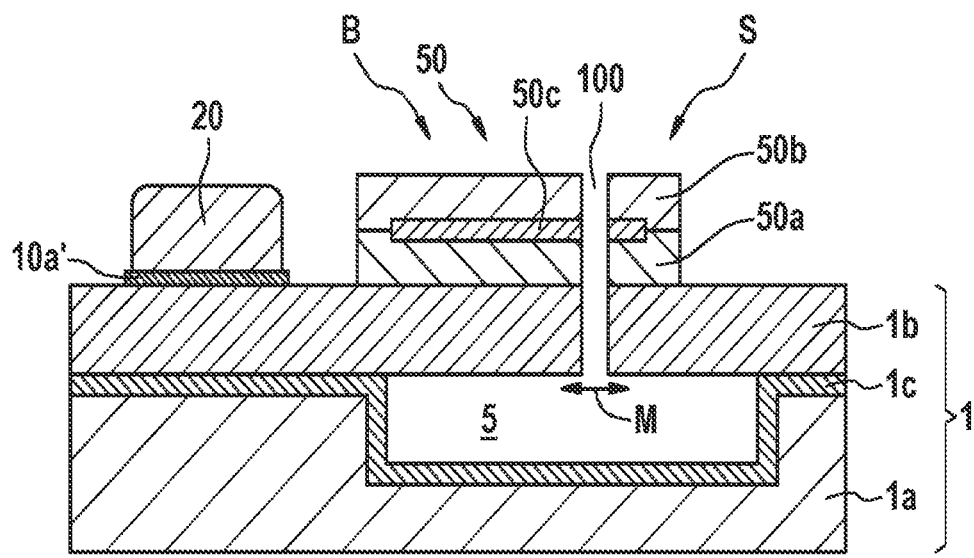

According to FIG. 1H, the exposed first and second hard mask layers 10a, 10b are then removed, an electrical contact pad 10a' formed by the electrically conductive first hard mask layer 10a remaining underneath the electrical contact element 20.

During operation, the deflectable portion B can be docked to the stationary portion S by electrically deflecting the corresponding portion of the covering wafer 1b, as a result of which a light switch function can be obtained. The movement direction is denoted by reference sign M in FIGS. 1G and 1H. The electrical deflection is carried out by applying a corresponding control voltage to the electrical contact element 20, for example.

Owing to the multilayered hard mask used, comprising the first hard mask layer 10a and the second hard mask layer 10b, it can be ensured that the vertical walls of the continuous trench 100 are oriented as perpendicularly as possible, thus making it possible to obtain docking over the entire surface and consequently an accurate light switch function.

The contact pad 10a' formed under the electrical contact element 20 from the first electrically conductive hard mask layer 10a ensures a good electrical connection between the electrical contact element 20 and the covering substrate 1b located thereunder.

Although the present invention has been described in full above on the basis of preferred exemplary embodiments, it is not limited thereto, but instead can be modified in various ways.

In particular, the stated materials and structures are only mentioned by way of example and are not limiting.

What is claimed is:

1. A method for producing a microoptoelectromechanical component, comprising the following steps:
    providing a base substrate including a cavity which is formed therein and is closed by a covering substrate;
    forming an optical waveguide on the covering substrate above the cavity, the optical waveguide including a sheathed waveguide core;
    applying an electrically conductive first hard mask layer over the optical waveguide and a surrounding part of the covering substrate;
    forming an electrical contact element on the first hard mask layer in a region of the surrounding part of the covering substrate;
    applying a second hard mask layer over the first hard mask layer and the electrical contact element;
    forming an etching opening in the first hard mask layer and the second hard mask layer for exposing some regions of an upper face of the optical waveguide;
    trench-etching the optical waveguide and the covering substrate located thereunder to divide the optical waveguide and the covering substrate located thereunder into a stationary portion and a deflectable portion which can be docked to the stationary portion by electrically deflecting the corresponding portion of the covering substrate; and removing the exposed first and second hard mask layers, wherein a contact pad formed by the electrically conductive first hard mask layer remains underneath the electrical contact element.

2. The production method as recited in claim 1, wherein an insulation layer, which extends into the cavity, is applied to the base substrate.

3. The production method as recited in claim 1, wherein the base substrate and the covering substrate are a silicon substrate.

4. The production method as recited in claim 1, wherein the first hard mask layer is a doped polysilicon layer and the second hard mask layer is a silicon oxide layer.

5. The production method as recited in claim 1, wherein the etching opening is formed using a resist mask.

6. The production method as recited in claim 1, wherein the optical waveguide core is made of silicon nitride and is sheathed by a lower covering layer and an upper covering layer made of silicon oxide.

7. The production method as recited in claim 1, wherein the trench-etching is carried out in a two-stage etching process in which the optical waveguide is trenched in a first etching step and the covering substrate located thereunder is trenched in a second etching step.

8. The production method as recited in claim 7, wherein the second hard mask layer is removed at least in some regions in the first etching step.

9. The production method as recited in claim 1, wherein the electrical contact element is made of aluminum.

10. A microoptoelectromechanical component, comprising:
a base substrate including a cavity which is formed therein and is closed by a covering substrate;
an optical waveguide on the covering substrate above the cavity, the optical waveguide including a sheathed waveguide core; and
an electrical contact element in a region of a surrounding portion of the covering substrate;
wherein a contact pad formed by an electrically conductive hard mask layer is arranged underneath the electrical contact element; and
wherein the optical waveguide and the covering substrate located thereunder are divided into a stationary portion and a deflectable portion, which can be docked to the stationary portion by electrically deflecting the corresponding portion of the covering substrate.

11. The microoptoelectromechanical component as recited in claim 10, wherein the electrically conductive hard mask layer is a polysilicon layer.

12. The microoptoelectromechanical component as recited in claim 10, wherein an insulation layer, which extends into the cavity, is applied to the base substrate.

13. The microoptoelectromechanical component as recited in claim 10, wherein the base substrate and the covering substrate are a silicon substrate.

14. The microoptoelectromechanical component as recited in claim 10, wherein the optical waveguide core is made of silicon nitride and is sheathed by a lower covering layer and an upper covering layer made of silicon oxide.

15. The microoptoelectromechanical component as recited in claim 10, wherein the electrical contact element is made of aluminum.

* * * * *